(12) United States Patent
Bremond et al.

(10) Patent No.: US 6,172,864 B1
(45) Date of Patent: *Jan. 9, 2001

(54) PROTECTION AGAINST OVERVOLTAGES OF AN INTERFACE OF TELEPHONE LINES

(75) Inventors: André Bremond, Veretz; Philippe Merceron, Vouvray, both of (FR)

(73) Assignee: SGS-Thomson Microelectronics S.A., Gentilly (FR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/816,771

(22) Filed: Mar. 18, 1997

(30) Foreign Application Priority Data

Mar. 26, 1996 (FR) .................................. 96 04068

(51) Int. Cl.[7] ..................................... H02H 1/00
(52) U.S. Cl. ........................... 361/119; 361/56; 361/111; 361/115
(58) Field of Search ................. 361/56, 58, 111, 361/113, 115, 118, 119

(56) References Cited

U.S. PATENT DOCUMENTS

| | | | |
|---|---|---|---|
| 4,480,152 | 10/1984 | Taylor | 179/81 R |
| 4,849,846 | 7/1989 | Hung et al. | 361/56 |
| 4,905,119 | * | 2/1990 | Webb | 361/119 |
| 5,537,287 | * | 7/1996 | Dreier | 361/119 |

OTHER PUBLICATIONS

French Search Report from French Patent Application 96 04068, filed Mar. 26, 1996.

Elektronik, vol. 40, No. 20, Oct. 1, 1991, Munchen, DE, pp. 132–138, M. Bollinger: "Bodyguards Für SLICs".

* cited by examiner

Primary Examiner—Stephen W. Jackson
(74) Attorney, Agent, or Firm—Wolf, Greenfield & Sacks, P.C.; James H. Morris; Theodore E. Galanthay

(57) ABSTRACT

The present invention relates to a system for protecting against overloads in a telephone system. The telephone system includes a telephone exchange, a ringing device and an interface, coupled to receive input signals on subscriber lines. The input signals are forwarded to either the telephone exchange or the ringing device depending upon the operating mode of the telephone system. The telephone line supplies a signal indicating the operating mode. A single protection device is coupled between the input of the subscriber lines and the interface. The protection device is controlled by the operating mode signal, and includes logic for protecting both the ringing device and the telephone exchange.

36 Claims, 4 Drawing Sheets

PROTECTION AGAINST OVERVOLTAGES OF AN INTERFACE OF TELEPHONE LINES

BACKGROUND OF THE INVENTION

1. Field of the Invention

The present invention relates to the protection against electric overvoltages of telephone exchanges and, more particularly, of the interface between a telephone line and an exchange. Such an interface, currently designated in the art as a Subscriber Line Interface Circuit (SLIC), is generally comprised of a card which receives, for example, eight telephone lines.

Although the present invention is described hereafter within the framework of this application, it should be noted that the present invention provides a protection system that can also apply to the protection of one or several electric conductors connected to other electric or electronic circuits.

2. Discussion of the Related Art

FIG. 1 shows a conventional embodiment of an SLIC. Between conductors T and R (Tip and Ring) of a subscriber telephone line and SLIC interface 1, is positioned a circuit 2 of inverting relays, called ringing relays. The ringing relays act to switch the line between two operating modes. A first so-called "ringing" operating mode connects conductors T and R, respectively through relays I1 and I2, to a ringing generator 3 via lines 3a and 3b. In a second so-called "speech" operating mode (shown in FIG. 1), conductors T and R are connected via relays I1 and I2 to circuit 1 via lines $E_1$ and $E_2$.

SLIC circuit 1 manages the transistor between the two operating modes. Circuit 1 has a control output 4 issuing a two-state signal for controlling a block 5 operating relays I1 and I2. The control of block 5 is generally performed via a transistor Tc, the transmitter of which is connected to the ground, the collector of which is connected to a control input of block 5 and the base of which is connected to terminal 4 via a resistor Rc. Block 5 is supplied by a positive voltage V (generally around 5 volts). Alternatively, the assembly comprised of transistor Tc and resistor Rc can be integrated into SLIC circuit 1.

The usual protection of the SLIC circuit and of ringing generator 3 is provided by placing protection device 6 between the line and relay circuit 2, and by placing protection device 7 between SLIC circuit 1 and circuit 2.

Device 6 provides protection for the ringing generator 3 when relays I1 and I2 connect the line thereto (in ringing mode), by connecting one or the other of conductors T and R to the ground as soon as the line voltage overcomes a determined threshold, for example, a voltage of ±200 volts. The selection of the voltage threshold is determined by the operating mode of the ringing generator. In the ringing mode, an a.c. voltage called the ringing signal is applied to the line and has a peak value generally between 50 and 100 volts RMS. The function of device 6 is to suppress any voltage higher than the ringing peak voltage.

Protection device 7 has the function of protecting SLIC circuit 1 when the contacts of relay circuit 2 connect the line thereto (in speech mode, the position shown in FIG. 1). Device 7 acts to connect one or the other of connectors T or R to the ground as soon as the voltage on the line exceeds a determined threshold corresponding to the normal voltage level on the line. In the speech mode, circuit 1 is supplied by a negative voltage generally included between −30 and −70 d.c. volts (for example −48 volts) using the ground as a reference. This voltage is called "battery voltage". The inputs, respectively E1 and E2, of circuit 1 on the line side have to be protected from any positive voltage as well as from any voltage which is more negative than the battery voltage.

Protection devices 6 and 7 generally are so-called crowbar devices. An example implementation of a typical protection device and the current-voltage characteristic of the example protection device are respectively shown in FIGS. 2A and 2B.

FIG. 2A shows a conventional embodiment of a half-protection circuit of the crowbar type for one of conductors T or R. In FIG. 2A, only one half of protection device 6 has been shown since it has the same structure between each of conductors T or R and the ground.

For the portion shown in FIG. 2A (protection of conductor T), device 6 includes a first anode-gate thyristor Th1 mounted between conductor T and the ground, its cathode being connected to the ground. The gate of thyristor Th1 is connected to the cathode of an avalanche diode Z1, the anode of which is connected to the ground. When a positive overvoltage exceeding the avalanche voltage of diode Z1 occurs on conductor T, diode Z1 starts an avalanche and turns on thyristor Th1. Device 6 includes a second cathode-gate thyristor Th2 mounted between conductor T and the ground, its anode being connected to the ground. The gate of thyristor Th2 is connected to the ground via a second avalanche diode Z2 mounted with a biasing opposite to that of avalanche diode Z1 associated with thyristor Th1. Diode Z2 starts an avalanche when a negative overload exceeding its avalanche voltage occurs on conductor T and, thereby, thyristor Th2 turns on.

The avalanche voltages of diodes Z1 and Z2 are set to correspond to the circuit protection threshold voltages, for example, ±200 volts.

FIG. 2B shows the current-voltage characteristic of a protection circuit such as shown in FIG. 2A. This drawing illustrates the shape of current It through thyristors Th1 and Th2 which are conducting according to the voltage Vt across them. The right portion of the curve corresponds to the action of thyristor Th1 and diode Z1, the left portion of the curve corresponding to the action of thyristor Th2 and diode Z2.

The protection device 7 between the SLIC and circuit 2 has a structure similar to that of device 6, but with different and asymmetrical triggering thresholds, for example, 0 and −50 volts. It should be noted that in the speech mode, device 6 is not necessary since device 7 triggers first.

A disadvantage of a system such as that shown in FIG. 1 is that the cost of the protection is high since it requires at least two protection devices to be supplied and mounted separately.

Another disadvantage of such a system is that, if an overvoltage occurs as relays I1 and I2 are connecting the line to SLIC circuit 1, protection device 7 will start operating. However, for the time period of the overload, a strong current flows through the contacts of relays I1 and I2, thereby risking to damage them and making it impossible to use static relays.

SUMMARY OF THE INVENTION

The present invention overcomes the disadvantages of known protection systems by providing a novel system for protecting a subscriber interface capable of avoiding the occurrence of excess currents in the ringing relays in case of an overload.

More generally, the present invention provides a system for protecting circuits, connected to at least one conductor via at least one relay, and for which it is desired to have different protection thresholds.

To achieve these objects, the present invention provides a method for protecting against overloads between a telephone exchange and relays connected to a subscriber line. The method includes the steps of connecting, between the subscriber line and the relays, a single protection device, the operation of which is parametered according to a signal issued by the subscriber interface, for controlling the relays.

In other words, the present invention provides a device for protection against overloads in an interface between a telephone exchange and relays connected to a subscriber line, the protection device including, for each conductor of the line, at least one switching means for connecting the conductor to the ground in case of an overvoltage exceeding a threshold value, and at least one means for automatically setting the threshold value based on a signal for controlling the relays.

According to one embodiment of the present invention, the means for setting the threshold value includes a switch mounted between a voltage control terminal of the switching means and a determined potential, the switch being controlled according to a state of the signal for controlling the relays issued by the interface.

According to another embodiment of the present invention, the switching means includes a thyristor mounted between the conductor and the ground and the gate of which is connected to the ground via an avalanche diode, the switch configuring the switching means between a first operating mode where the threshold value corresponds to the avalanche voltage of the diode and a second operating mode where the threshold value corresponds to the determined potential.

According to another embodiment of the present invention, the switch includes a transistor controlled responsive to the state of the signal that controls the relays.

According to another embodiment of the present invention, the device includes, for each conductor, a first unit for protection against a positive overvoltage and a second unit for protection against a negative overvoltage, each unit including a switch associated with a switching means.

According to another embodiment of the present invention, the determined potential associated with the switch of the first unit is the ground, and the determined potential associated with the switch of the second unit corresponds to the battery potential of the interface.

According to another aspect of the present invention, a system for protecting against overloads between a telephone exchange and relays connected to a subscriber line includes a single protection device coupled between the line and the relays.

According to another aspect of the present invention, a system for protecting against overloads for two circuits connected to at least one conductor via at least one relay includes a protection device coupled between the conductor and the relay including two voltage-controlled switching means for connecting the conductor to a reference potential in case of an overvoltage exceeding one out of two threshold values, the threshold values defining an operating range associated with one of the circuits. The protection device further includes two means for automatically setting each of the threshold values according to a signal for controlling the relay.

According to another embodiment of the present invention, each means for setting a threshold value includes a switch connecting a control terminal of the switching means associated therewith to a determined potential, the control terminal being also connected to the ground via an avalanche diode.

These objects, characteristics and advantages as well as others, of the present invention, will become apparent upon review of the following detailed description of embodiments of the invention discussed in relation to the accompanying drawings.

DETAILED DESCRIPTION

For clarity, the same components have been referred to by the same references in the different drawings.

Figure 3:
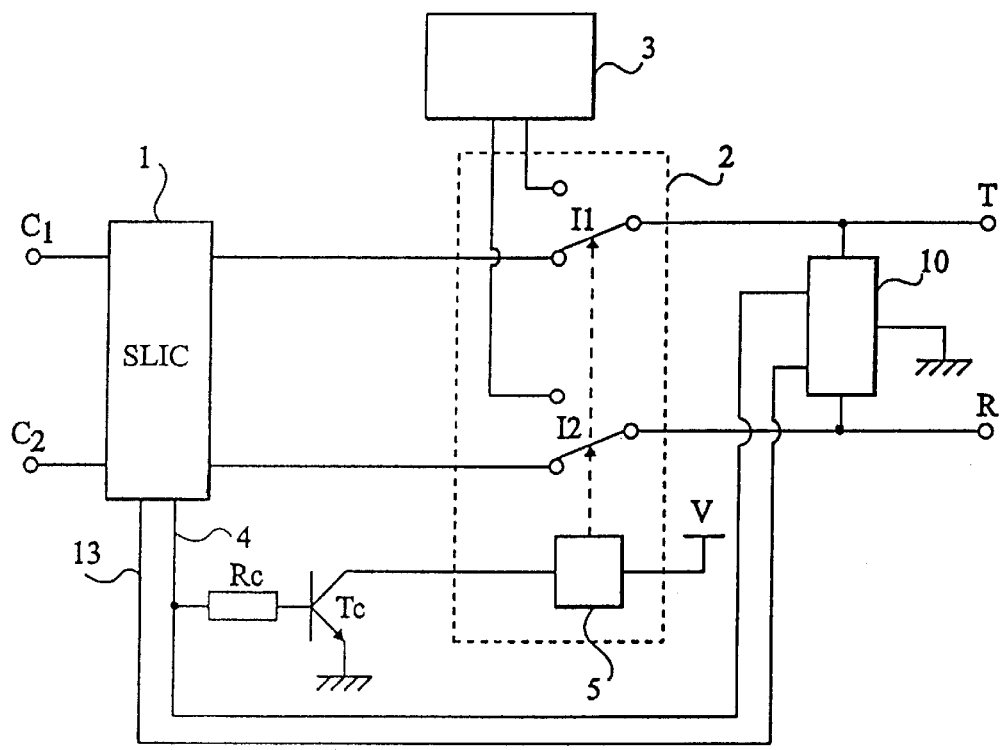
FIG. 3 shows, in the form of block diagrams, an embodiment of a protection system according to the present invention.

FIG. 3 shows a first embodiment of a protection system according to the present invention.

Figure 1:
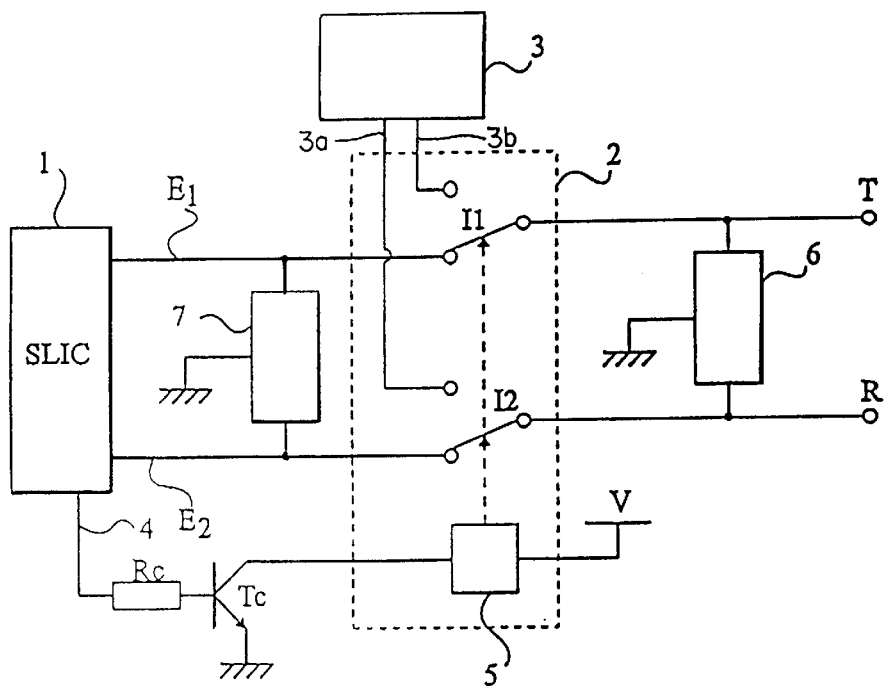
FIGS. 1, 2A and 2B, previously described, are meant to show the state of the art and the problem to solve.

A characteristic of the present invention is to provide a single protection device 10 both for an SLIC circuit 1 and for a ringing generator 3. FIG. 3 shows the same type of diagram as in FIG. 1, but wherein the conventional protection devices 6 and 7 (FIG. 1) have been replaced with the sole protection device 10 according to the present invention.

As previously, a circuit 2 including coil-controlled ringing relays I1 and I2 or other detection and control circuits is connected, on the one hand, to the subscriber line (conductors T and R), and on the other hand to SLIC interface 1 and to ringing generator 3.

A characteristic of the present invention is that protection device 10 has two operating modes according to the position of relays I1 and I2. The selection of the operating mode of device 10 is performed by means of a signal for controlling circuit 2, issued by circuit 1, through a first output terminal 4.

Device 10 is positioned between circuit 2 and the line so as to suppress the overloads from the telephone line before they reach relays I1 and I2. The protection device according to the present invention thus also protects relay circuit 2, allows for the use of static relays.

Figure 4:
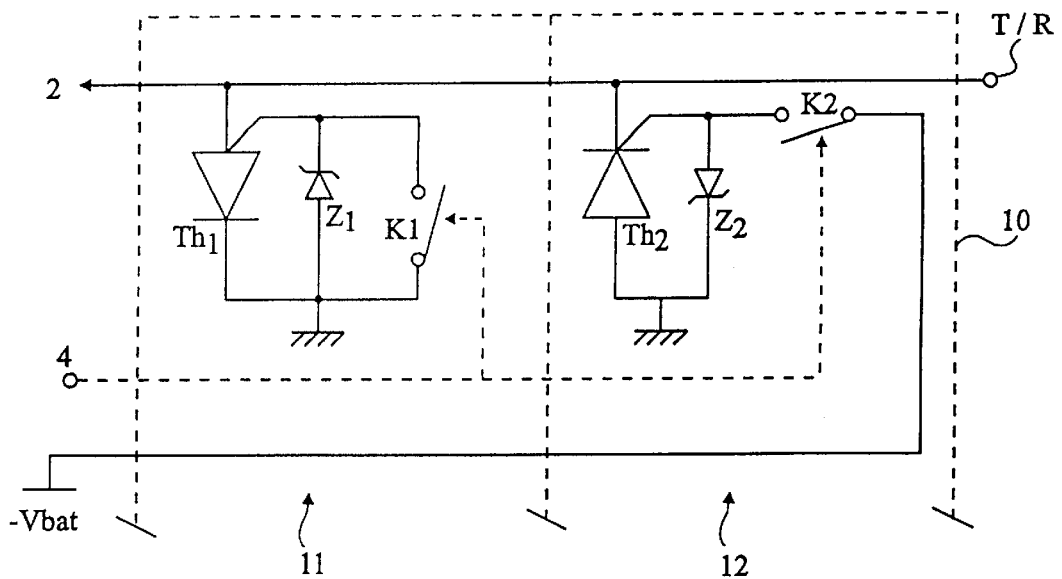
FIG. 4 shows, partially and schematically, a first embodiment of a protection device according to the present invention adapted to the system of FIG. 3.

FIG. 4 shows, schematically, a portion of a first partial embodiment of device 10. In FIG. 4, only one half of device 10 (for protection against overloads on one of conductors T or R) has been shown. The entire protection device 10 includes two assemblies such as that shown in FIG. 4, each respectively associated with conductors T and R.

According to the present invention, protection device 10 includes, for each conductor R or T, a unit 11 for positive overvoltages and a unit 12 for negative overvoltages.

Unit 11 includes an anode-gate thyristor Th1 mounted between conductor T or R and the ground. The gate of thyristor Th1 is also connected to the ground via a first avalanche diode Z1.

A characteristic of the present invention is that a first switch K1 is mounted in parallel with diode Z1 and is controlled by a signal 4 for controlling relay circuit 2.

The function of switch K1 is to set a determined potential for triggering the protection by short-circuiting avalanche diode Z1 when relays I1 and I2 (FIG. 3) establish a contact between the line and interface 1 (speech mode) so that thyristor Th1 is on as soon as a positive voltage appears on conductor T or R.

Figure 2A:
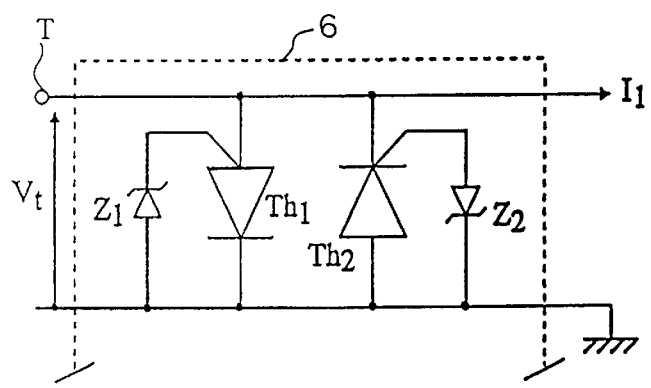
Figure 2B:
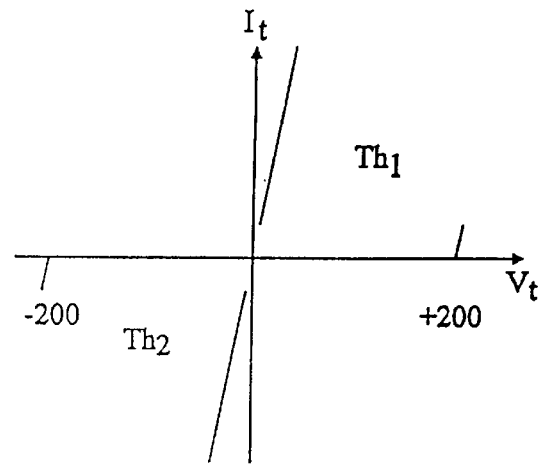

In the ringing mode, that is, when relays I1 and I2 establish a contact between conductors T and R and ringing generator 3, switch K1 is open and the thyristor Th1 associated with avalanche diode Z1 operates as in the conventional device shown in FIG. 2A.

Unit 12 includes a cathode-gate thyristor Th2 mounted between conductor T or R and the ground. The gate of thyristor Th2 is also connected to the ground via an avalanche diode Z2.

A characteristic of the present invention is that unit 12 includes a second switch K2 between the gate of thyristor Th2 and a negative potential −Vbat, determined to correspond to the threshold of the negative voltage for protecting interface 1, that is, battery voltage −Vbat.

Switch K2 has the function of forcing the potential of the gate of thyristor Th2 to potential −Vbat when relays I1 and I2 are positioned to ensure the contact between the line and SLIC interface 1 (speech mode). Potential −Vbat is obtained by connecting a terminal of switch K2 to the battery voltage present on the subscriber card, for example, on a second output terminal 13 of SLIC interface 1. Thus, in the speech mode, the protection acts as soon as the potential on line T or R is more negative than −Vbat. According to the present invention, switch K2 is controlled, as switch K1, by signal 4.

In the ringing mode, switch K2 is off and unit 12 operates in the same way as the conventional circuit discussed in relation with FIG. 2A.

Each switch K1 or K2 thus constitutes a means for automatically setting the triggering potential of the unit, respectively, 11 or 12, to a desired value based on the state of the signal for controlling relays I1 and I2. A first value of the triggering potential corresponds to the avalanche voltage of the diode, respectively Z1 or Z2, and a second value corresponds to the determined potential, respectively 0 or −Vbat, to which the switch, respectively K1 or K2, is connected.

Thus, the protection device 10 according to the present invention can be parametered between the two operating modes (speech and ringing). Moreover, the selection of the operating mode is performed automatically according to the present invention by means of the control signal available at the SLIC interface and meant, as in conventional circuits, for controlling relay circuit 2.

An advantage of the present invention is that, a single protection device provides protection against overvoltages from the line for SLIC interface 1, ringing generator 3 and relay circuit 2 as well.

Figure 5:
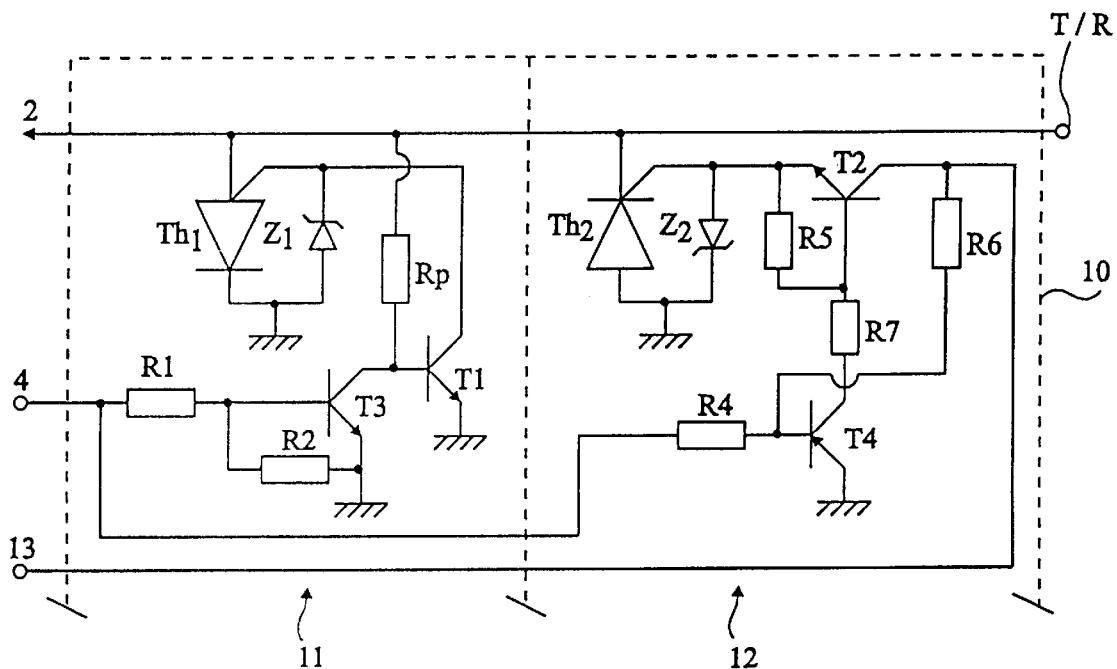
FIG. 5 shows a detailed electric diagram of a first embodiment of a portion of a protection device according to the present invention.
Figure 6:
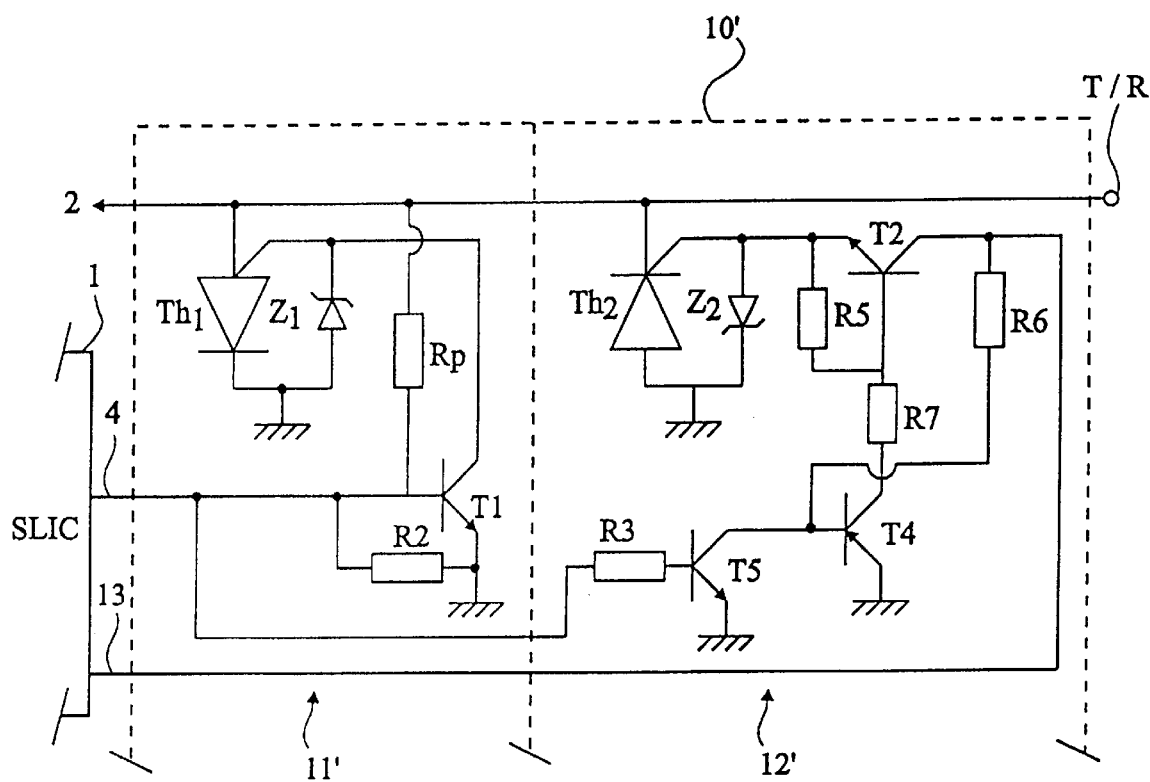
FIG. 6 shows a detailed electric diagram of a second embodiment of a portion of a protection device according to the present invention.

FIGS. 5 and 6 respectively show two additional detailed embodiments of the protection device according to the present invention. A first embodiment shown in FIG. 5 corresponds to a practical implementation of the protection device for a system such as that shown in FIG. 3, where control transistor Tc and control resistor Rc of relay circuit 2 are external to SLIC interface 1. A second embodiment shown in FIG. 6 may be used in a system where the SLIC circuit integrates control transistor Tc and resistor Rc and thus issues, on its output 4, a control signal which is inverted with respect to the first embodiment.

In the first embodiment shown in FIG. 5, switch K1 is comprised of an NPN bipolar transistor T1, the transmitter of which is connected to the ground and the collector of which is connected to the gate of thyristor Th1. The base of transistor T1 is connected to the collector of an NPN transistor T3 as well as to conductor T or R via a protection resistor Rp. Transistor T3 receives on its base, via a resistor R1, the control signal issued by terminal 4 of SLIC interface 1. The transmitter of transistor T3 is connected to the ground as well as, via a resistor R2, to its base. The function of resistors R1 and R2 is to bias transistor T3.

In the embodiment shown in FIG. 5, it is assumed that the control signal issued by terminal 4 is in a low state (0 volts) in the speech mode and in a high state (5 volts) in the ringing mode.

In the ringing mode, transistor T3 receives a base current through resistor R1 and is thus saturated. Transistor T1 is thus blocked since its base is at a level of zero volts. This corresponds to the off-state of switch K1.

In the speech mode, transistor T3 is blocked and the base of transistor T1 thus receives current when the voltage on conductor T or R is positive. Thus, as soon as the voltage on conductor T or R becomes positive, transistor T1 saturates and thus suppresses any positive overvoltage. The protective resistor Rp of transistor T1 is selected so that this transistor is saturated.

For example, in a particular embodiment, values of 1 kΩ can be chosen for resistances R1 and R2 and a value of 10 kΩ can be chosen for resistance R3.

The switch K2 of unit 12 is comprised of an NPN-type bipolar transistor T2, the transmitter of which is connected to the gate of thyristor Th2 and the collector of which is connected to the terminal 13 issuing voltage −Vbat. The base of transistor T2 is connected by a resistor R7 to the collector of a PNP bipolar transistor T4, the transmitter of which is grounded and the base of which is connected to terminal 4 via a resistor R4. The base of transistor T2 is also connected to its transmitter via a resistor R5 and the base of transistor T4 is connected to the collector of transistor T2 via a resistor R6.

In the ringing mode, the base-transmitter junction of transistor T4 is reverse-biased since terminal 4 is at a positive potential. Transistor T4 is thus blocked and transistor T2 is also blocked by means of resistor R5. This corresponds to the off-state of switch K2.

In the speech mode, transistor T4 is biased by means of resistors R4 and R6 and is thus saturated. Thus, a current flows through the base of transistor T2 which also saturates. This corresponds to the on-state of switch K2.

The value of resistance R5 is selected to enable the blocking of transistor T2 in the ringing mode. Resistors R4 and R6 which constitute a divider bridge of the biasing voltage of transistor T4, are chosen so that their midpoint (base of transistor T4) is at a potential lower than −0.6 volt when terminal 4 is at a zero potential and so that the base of transistor T4 is at a potential higher than −0.6 volt when terminal 4 is at a potential corresponding to its other state (for example 5 volts).

For example, in a particular embodiment, resistance R4 may have a value of 100 Ω, resistance R5 may have a value of 1 MΩ and resistance R6 may have a value of 4.7 kΩ.

Transistors T1 (unit 11) and T2 (unit 12) are selected to bear a voltage at least equal to the avalanche voltage of diodes Z1 and Z2. This condition is not required for transistor T3 (unit 11) since transistor T3 only sees the control voltage of terminal 4.

In the foregoing description, the influence of the base-transmitter voltage drops and of the resistive voltage drops over the switching of thyristors Th1 and Th2 in case of an over-voltage has been neglected.

FIG. 6 shows a second detailed embodiment of protection device 10 for the case where control transistor Tc and control resistor Rc are integrated to SLIC interface circuit 1 and where terminal 4 issues a control signal which is in a low state in the ringing mode and in a high state in the speech mode.

In this case, transistor T3 of unit 11 of FIG. 5 is no longer necessary and resistor R2 of unit 11' (FIG. 6) is directly mounted on transistor T1. For unit 12', the signal issued by terminal 4 of interface 1 must, however, be inverted. For this purpose, a resistor R3 and an NPN bipolar transistor T5 are interposed between terminal 4 and the base of transistor T4. The transmitter of transistor T5 is connected to the ground while its collector is connected to the base of transistor T4. The base of transistor T5 is connected to terminal 4 via resistor R3.

The operation of the embodiment shown in FIG. 6 can be inferred from the operation discussed in relation with FIG. 5.

Of course, the present invention is likely to have various alterations, modifications, and improvements which will readily occur to those skilled in the art. In particular, the choice of the values of the resistances depends on the operating voltages of the protection device. Similarly, the different bipolar transistors can, in case of need, be replaced with MOS transistors.

In addition, the present invention also applies to any system where circuits are connected to one or several conductors via relays and for which the protection thresholds are different for each circuit. It should be noted that, in such applications, the voltage reference cannot be the ground but a positive or negative potential. Further, any unit 11 or 12 can be provided to operate symmetrically or asymmetrically between two conductors. In addition, the number of protected conductors is not necessarily two but can be any number.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for protecting against overloads in a telephone system at an interface between a telephone exchange and a plurality of subscriber lines, each of said subscriber lines having an input terminal, said interface including a plurality of relays associated with said plurality of subscriber lines, the operation of said relays controlled by a signal issued by said telephone exchange, said method comprising the step of:

connecting, to said subscriber lines, between said subscriber input terminal and said associated relays, a protection device for protecting said telephone system against all voltage overloads, said protection device controlled by said signal controlling said relays.

2. A device for protection against overloads in a telephone system, said telephone system comprising a telephone exchange coupled by an interface to a plurality of subscriber lines, said interface comprising a plurality of relays, each of said relays coupled to a corresponding one of said subscriber lines, said device coupled to said relays and to a plurality of conductors of said subscriber lines, said device comprising:

for each conductor of each line, at least one switching means for connecting the conductor to ground in the event of an overvoltage exceeding a threshold value, said switching means including at least one means for automatically setting the threshold value based on a signal controlling the relays.

3. A protection device according to claim 2, wherein the means for automatically setting the threshold value comprises a switch mounted between a voltage control terminal of said switching means and a determined potential, the switch being controlled according to a state of said signal for controlling the relays, wherein said signal is issued by said telephone exchange.

4. A protection device according to claim 3, wherein the switching means further comprises a thyristor mounted between said conductor and ground, said thyristor having a gate portion connected to ground via an avalanche diode, the switch configuring the switching means between a first operation mode where the threshold value corresponds to an avalanche voltage of the diode and a second operating mode where the threshold value corresponds to said determined potential.

5. A protection device according to claim 3, wherein said switch comprises a transistor controlled responsive to the state of said signal for controlling the relays.

6. A protection device according to claim 2, wherein said protection device further comprises:

for each conductor of each line, a first unit for protection against a positive voltage exceeding a positive voltage threshold and a second unit for protection against a negative voltage exceeding a negative voltage threshold, each unit further comprising a switch and a switching means, each switching means associated with one of said positive or negative voltage thresholds for connecting the conductor of each line to ground in the event that the respective voltage threshold is exceeded; and wherein each of said switching means further comprises means for automatically setting said respective threshold value responsive to said signal controlling said relays.

7. A protection device according to claim 6, wherein said means for setting said threshold values comprises a switch mounted between a voltage control terminal of said switching means and a determined potential, the switch being controlled according to a state of said signal for controlling the relays, wherein said signal is issued by said telephone exchange.

8. A protection device according to claim 7, wherein the switching means further comprises a thyristor mounted between said conductor and ground, said thyristor having a gate portion connected to ground via an avalanche diode, the switch configuring the switching means between a first operation mode where the threshold value corresponds to an avalanche voltage of the diode and a second operating mode where the threshold value corresponds to said determined potential.

9. A protection device according to claim 6, wherein said switch comprises a transistor controlled responsive to the state of said signal for controlling the relays.

10. A protection device according to claim 6, wherein the determined potential associated with the switch of the first unit is the ground, and wherein the determined potential associated with the switch of the second unit corresponds to a battery potential of said interface.

11. A system comprising:
a telephone exchange coupled by an interface to a plurality of subscriber lines, said interface comprising a plurality of relays, each of said relays coupled to a corresponding one of said subscriber lines;
a protection device coupled to said relays and to a plurality of conductors of said subscriber lines, said protection device further comprising:
for each conductor of each line, at least one switching means for connecting the conductor to the ground in case of an overvoltage exceeding a threshold value, said switching means including at least one means for automatically setting the threshold value based on a signal controlling the relays.

12. The system of claim 11, wherein the means for automatically setting the threshold value comprises a switch mounted between a voltage control terminal of said switching means and a determined potential, the switch being controlled according to a state of said signal for controlling the relays, wherein said signal is issued by said telephone exchange.

13. The system of claim 11, wherein the switching means further comprises a thyristor mounted between said conductor and ground, said thyristor having a gate portion connected to ground via an avalanche diode, the switch configuring the switching means between a first operation mode where the threshold value corresponds to an avalanche voltage of the diode and a second operating mode where the threshold value corresponds to said determined potential.

14. The system of claim 11, wherein each switch of each protection unit comprises a transistor controlled responsive to the state of said signal for controlling the relays.

15. The system according to claim 11, wherein said protection device further comprises:
for each conductor of each line, a first unit for protection against a positive voltage exceeding a positive voltage threshold and a second unit for protection against a negative voltage exceeding a negative voltage threshold, each unit further comprising a switch and a switching means, each switching means associated with one of said positive or negative voltage thresholds for connecting the conductor of each line to ground in the event that the respective voltage threshold is exceeded; and
wherein each of said switching means further comprises means for automatically setting said respective threshold value responsive to said signal controlling said relays.

16. A protection device according to claim 15, wherein said means for setting said threshold values comprises a switch mounted between a voltage control terminal of said switching means and a determined potential, the switch being controlled according to a state of said signal for controlling the relays, wherein said signal is issued by said telephone exchange.

17. A protection device according to claim 16, wherein the switching means further comprises a thyristor mounted between said conductor and ground, said thyristor having a gate portion connected to ground via an avalanche diode, the switch configuring the switching means between a first operation mode where the threshold value corresponds to an avalanche voltage of the diode and a second operating mode where the threshold value corresponds to said determined potential.

18. A protection device according to claim 15, wherein each switch of each protection unit comprises a transistor controlled responsive to the state of said signal for controlling the relays.

19. A protection device according to claim 16, wherein the determined potential associated with the switch of the first unit is the ground, and wherein the determined potential associated with the switch of the second unit corresponds to a battery potential of said interface.

20. A system for protecting against overloads comprising two circuits connected to at least one conductor via at least one relay includes, between the conductor and the relay, a protection device including:
two voltage-controlled switching means for connecting the conductor to a reference potential in case of an overvoltage exceeding one out of two threshold values defining an operating range associated with one of the circuits; and
two means for automatically setting each of the threshold values according to a signal for controlling the at least one relay.

21. A system for protection against overloads according to claim 20, wherein each of said means for setting a threshold value includes a switch connecting a control terminal of the switching means associated therewith to a determined potential, the control terminal being also connected to the ground via an avalanche diode.

22. A system for protection against overloads according to claim 21, wherein said switching means further comprises a thyristor mounted between said conductor and ground, said thyristor having a gate portion connected to said avalanche diode, said switch configuring said switching means between a first operation mode where the threshold value corresponds to an avalanche voltage of said diode and a second operating mode where the threshold value corresponds to said determined potential.

23. A method for protecting an system against overload, the system including an interface coupled to a plurality of input lines, said interface including a plurality of relays, with one relay associated with each input line, said system further including a plurality of devices, wherein said input lines are connected to one of said plurality of devices, respectively, responsive to a plurality of different positions of said relay, said plurality of relays controlled by a signal issued by one of said plurality of devices, indicating a mode of operation, said method comprising the steps of:
disposing, between said plurality of subscriber lines and said relays, a protection circuit, said protection circuit receiving said signal from said telephone exchange;
coupling, responsive to said signal indicating a mode of operation, said signal lines to one of said plurality of devices; and
coupling, responsive to said signal, said protector circuit to one of a plurality of voltage potentials corresponding to said coupled device, said voltage potential for protecting said respective coupled device against overload.

24. The method of claim 23 wherein said system is a telephone system, one of said plurality of devices is a ringing device, and said second one of said plurality of devices is a telephone exchange.

25. An apparatus for protecting against voltage overloads in a system comprising:
a plurality of signal lines coupled to a like plurality of conductors;
interface means for alternately coupling said plurality of signal lines to a plurality of devices; and means, coupled between said interface means and said conductors, for protecting each of said plurality of devices from voltage overloads and operative in response to a control signal from one of the plurality of devices.

26. The apparatus of claim 25, wherein said means for protecting further comprises, for each signal line, means for connecting said signal line to ground responsive to a voltage on said lines exceeding a plurality of determined voltage thresholds, said plurality of determined voltage thresholds corresponding to said plurality of devices.

27. The apparatus of claim 26, wherein said means for connecting said signal line to ground further comprises:
    a plurality of protection units, corresponding to said plurality of determined voltage thresholds, each of said protection units further comprising:
    means for setting a threshold value, said means for setting a threshold value including a switch mounted between a voltage control terminal of said protection unit and said respective determined voltage threshold.

28. The apparatus of claim 27, wherein said voltage control terminal further comprises a thyristor mounted between said conductor and ground, said thyristor having a gate portion connected to ground via an avalanche diode, and wherein the switch of the protection unit configures the means for setting a threshold value between a first operation mode where the threshold value corresponds to an avalanche voltage of the diode an a second operating mode where the threshold corresponds to the respective determined voltage threshold.

29. An apparatus for controlling overload in a telephone system comprising:
    a pair of signal lines driven by a corresponding pair of conductors;
    a ringing device;
    a telephone exchange;
    a mode signal line, coupled to said telephone exchange, for indicating a mode of operation of said telephone system;
    an interface unit, coupled to said signal lines, said interface unit comprising a pair of relays, each relay coupled to one of said signal lines of said pair, said relays coupling said ringing device to said signal lines in a first position, said relays coupling said telephone exchange to said signal lines in a second position;
    a protection device, coupled to said pair of signal lines, between said conductors and said interface unit, said protection device further coupled to said mode signal line, said protection device for protecting said ringing device and said telephone device against voltage overloads.

30. The apparatus of claim 29, wherein said protection device further comprises:
    a first protection unit for protecting said ringing device from overload;
    a second protection unit for protecting said telephone exchange from overload; and
    wherein said operation of said protection device is responsive to a state of said mode signal line.

31. The apparatus of claim 30, wherein said first protection unit further comprises:
    a switch, coupled between said signal line and a ground, for connecting said signal line to ground in the event of an overvoltage;
    a thyristor, mounted between said conductor and ground, said thyristor having a gate portion connected to ground via an avalanche diode; and
    wherein the switch configures said protection unit between a first mode of operation where the threshold value corresponds to an avalanche voltage of the diode and a second operating mode where the threshold corresponds to ground.

32. The apparatus of claim 31, wherein said switch further comprises:
    a first transistor having a base, transmitter and collector portion, said collector of said first transistor coupled to said gate of said thyristor, said transmitter of said transistor coupled to ground;
    a second transistor, having a base, transmitter, and collector portion, said base coupled to said mode signal line via a first resistor, said collector coupled to said base of said first transistor, said transmitter coupled to ground;
    a second resistor, coupled between said first resistor and said transmitter of said second transistor; and
    a third resistor coupled between said conductor and said base of said first transistor.

33. The apparatus of claim 31, wherein said switch further comprises:
    a first transistor having a base, transmitter and collector portion, said collector of said first transistor coupled to said gate of said thyristor, said transmitter of said transistor coupled to ground, and said base of said transistor coupled to said mode signal line;
    a first resistor, coupled between said mode signal line and said transmitter of said second transistor; and
    a second resistor, coupled between said base of said first transistor and said conductor.

34. The apparatus of claim 30, wherein said second protection unit further comprises:
    a switch, coupled between said signal line and a batter voltage, for connecting said signal line to said battery voltage in the event of an overvoltage;
    a thyristor, mounted between said conductor and ground, said thyristor having a gate portion connected to ground via an avalanche diode; and
    wherein the switch configures said protection unit between a first mode of operation where the threshold value corresponds to an avalanche voltage of the diode and a second operating mode where the threshold corresponds to ground.

35. The apparatus of claim 34, wherein said switch further comprises:
    a NPN transistor having a base, transmitter and collector portion, said transmitter of said first transistor coupled to said gate of said thyristor, said collector of said transistor coupled to said battery voltage;
    a PNP transistor, having a base, transmitter, and collector portion, said base coupled to said mode signal line via a first resistor, said collector coupled to said base of said NPN transistor via a second resistor, said transmitter coupled to ground;
    a third resistor, coupled between said second resistor and said transmitter of said NPN transistor; and
    a fourth resistor coupled between said base of said PNP transistor and said collector of said NPN transistor.

36. The apparatus of claim 34, wherein said switch further comprises:
    a first NPN transistor having a base, transmitter and collector portion, said transmitter of said first transistor coupled to said gate of said thyristor, said collector of said transistor coupled to said battery voltage;

a PNP transistor, having a base, transmitter, and collector portion, said collector coupled to said base of said first NPN transistor via a first resistor, said transmitter coupled to ground;

a second resistor, coupled between said first resistor and said transmitter of said NPN transistor;

a second NPN transistor having a base, transmitter and collector portion, said transmitter portion coupled to ground, said base coupled to said mode signal line via a fourth resistor, and said collector coupled to said base of said PNP transistor; and a fourth resistor coupled between said base of said PNP transistor and said collector of said NPN transistor.

* * * * *